United States Patent
Abadi et al.

(10) Patent No.: US 10,560,356 B2
(45) Date of Patent: Feb. 11, 2020

(54) ASSURING DATA CORRECTNESS IN NON-STABLE NETWORK ENVIRONMENT

(71) Applicant: International Business Machines Corporation, Armink, NY (US)

(72) Inventors: Aharon Abadi, Petach Tikva (IL); Dmitri Pikus, Haifa (IL)

(73) Assignee: International Business Machines Corporation, Armonk, NY (US)

(*) Notice: Subject to any disclaimer, the term of this patent is extended or adjusted under 35 U.S.C. 154(b) by 265 days.

(21) Appl. No.: 15/209,757

(22) Filed: Jul. 14, 2016

(65) Prior Publication Data

US 2018/0019934 A1    Jan. 18, 2018

(51) Int. Cl.
*G06F 11/16*    (2006.01)
*H04L 12/26*    (2006.01)
*H04L 29/08*    (2006.01)

(52) U.S. Cl.
CPC ...... *H04L 43/0823* (2013.01); *G06F 11/1662* (2013.01); *H04L 67/02* (2013.01); *G06F 2201/805* (2013.01)

(58) Field of Classification Search
None
See application file for complete search history.

(56) References Cited

U.S. PATENT DOCUMENTS

| | | | |
|---|---|---|---|
| 5,897,642 A * | 4/1999 | Capossela | G06F 8/71 |
| 7,366,460 B2 | 4/2008 | O'farrell et al. | |
| 7,401,127 B2 * | 7/2008 | Tsuda | G06F 8/60 |
| | | | 709/217 |
| 8,352,934 B1 * | 1/2013 | Borole | G06F 8/65 |
| | | | 709/222 |
| 8,503,984 B2 | 8/2013 | Winbush et al. | |
| 8,509,751 B2 | 8/2013 | Lock et al. | |
| 9,015,236 B1 | 4/2015 | Fredinburg et al. | |
| 2004/0010786 A1 * | 1/2004 | Cool | G06F 8/65 |
| | | | 717/170 |
| 2004/0098450 A1 * | 5/2004 | Rocchetti | G06F 8/61 |
| | | | 709/203 |
| 2005/0044164 A1 | 2/2005 | O'farrell et al. | |
| 2005/0228798 A1 * | 10/2005 | Shepard | H04L 67/34 |
| 2009/0133014 A1 * | 5/2009 | Laurila | G06F 8/60 |
| | | | 717/174 |
| 2009/0222810 A1 * | 9/2009 | Walston | G06F 11/1433 |
| | | | 717/172 |
| 2010/0318967 A1 * | 12/2010 | Bhatia | G06F 8/65 |
| | | | 717/122 |

(Continued)

*Primary Examiner* — Joshua Joo
(74) *Attorney, Agent, or Firm* — G.E Ehrlich

(57) ABSTRACT

A computer implemented method of assuring correctness of data updated at a remote server and used by a local application, comprising one or more processors at a client terminal adapted to receive from a remote server updated values for a plurality of data items associated with a dataset required for execution of an application executed by the processor(s) where the dataset defines a close relation among the plurality of associated data items, determine whether the reception includes updated values for all of the associated data items, retrieve automatically from a local memory resource, previous values for all of the associated data items in case the updated value is missing for at least one of the associated data items and provide to the application the updated values or the previous values according to the determination.

14 Claims, 2 Drawing Sheets

(56) References Cited

U.S. PATENT DOCUMENTS

| | | | |
|---|---|---|---|
| 2011/0131512 A1* | 6/2011 | Yan | G06F 9/451 |
| | | | 715/763 |
| 2011/0321024 A1* | 12/2011 | Knothe | G06F 8/656 |
| | | | 717/168 |
| 2012/0216201 A1* | 8/2012 | Aghajanyan | H04L 67/1097 |
| | | | 718/100 |
| 2014/0012992 A1* | 1/2014 | Koka | H04L 47/70 |
| | | | 709/226 |
| 2014/0089619 A1* | 3/2014 | Khanna | G06F 17/30578 |
| | | | 711/166 |
| 2015/0262242 A1* | 9/2015 | Motta | G06F 8/65 |
| | | | 705/14.64 |
| 2015/0301821 A1* | 10/2015 | Danne | H04L 67/06 |
| | | | 717/169 |
| 2016/0291965 A1* | 10/2016 | Li | G06F 8/65 |
| 2017/0003951 A1* | 1/2017 | Newell | G06F 8/65 |

\* cited by examiner

ASSURING DATA CORRECTNESS IN NON-STABLE NETWORK ENVIRONMENT

BACKGROUND

The present invention, in some embodiments thereof, relates to assuring correctness of data used by an application, and, more specifically, but not exclusively, to assuring correctness of data missing due to a non-stable network connection.

Mobile computing is rapidly increasing taking advantage of the ever growing networking infrastructures to provide better services and/or user experience to users using their mobile client terminals, for example, Smartphones, tablets, laptops, network connected wearable devices and the like. Mobile and web applications executed on the mobile client terminals used by the users may often require data that is available from remote resources such as, for example, servers, remote services, backend services and/or cloud services.

The mobile and web applications may therefore interact with the remote servers over network(s) in order to fetch and/or acquire data that required during execution of the mobile and web applications. A solid and reliable network connection may therefore be essential for the proper execution of the mobile and web applications.

SUMMARY

According to some embodiments of the present invention there are provided methods for assuring correctness of data updated at a remote server and used by a local application, comprising using one or more processors at a client terminal adapted to:

Receive from a remote server updated values for a plurality of data items associated with a dataset required for execution of an application executed by the one or more processors. The dataset defines a close relation among the plurality of associated data items.

Determine whether the reception includes updated values for the plurality of associated data items.

Retrieve automatically, from a local memory resource, previous values for the plurality of associated data items in case the updated value is missing for one or more of the plurality of associated data items.

Provide to the application the updated values or the previous values according to the determination.

The close relation of the dataset indicates that the associated data items are interdependent and are required together as a set by the application.

The close relation of the dataset indicates that the associated data items are updated by the remote server between communication session with the remote server.

The updated value is missing for the one or more associated data item due to a communication failure with the remote server. The determination includes checking reception of the updated value for each of the plurality of associated data items.

The local memory resource is a cache of the one or more processors, a memory coupled to the one or more processor and/or a non-volatile persistent memory coupled to the one or more processors.

The associated data items are associated with the dataset by a user identifying the close relation among the plurality of associated data items.

The associated data items are associated with the dataset by applying a text analysis on one or more documents relating to the remote server to identify the close relation among the plurality of associated data items.

The associated data items are associated with the dataset by using one or more ontologies to extract the dataset from a domain comprising the remote server.

The associated data items are associated with the dataset by analyzing one or more documents of the application with respect to code of the application to identify one or more traceability links among the plurality of associated data items.

The associated data items are associated with the dataset by applying a static code analysis to identify the close relation among the plurality of associated data items.

According to some embodiments of the present invention there are provided systems for assuring correctness of data updated at a remote server and used by a local application, comprising a network interface for communicating with a remote server, a program store storing a code and one or more processors coupled to the network interface and the program store for executing the stored code, the code comprising:

Code instructions to receive from a remote server updated values for a plurality of data item associated with a dataset required for execution of an application executed by the one or more processor. The dataset defines a close relation among the plurality of associated data items.

Code instructions to determine whether the reception includes updated values for all of the associated data items.

Code instructions to retrieve automatically from a local memory resource, previous values for all of the associated data items in case the updated value is missing for one or more of the plurality of associated data items.

Code instructions to provide to the application the updated values or the previous values according to the determination.

The updated value is missing for the one or more associated data items due to a communication failure with the remote server. The determination includes checking reception of the updated value for each of the plurality of associated data items.

The local memory resource is a cache of the one or more processor, a memory coupled to the one or more processor and/or a non-volatile persistent memory coupled to the one or more processor.

The associated data items are associated with the dataset by a user identifying the close relation among the plurality of associated data items.

The associated data items are associated with the dataset by applying one or more of a plurality of automated tools to identify the close relation among the plurality of associated data items. The automated tool is a text analysis applied to one or more document relating to the remote server, an ontology applied to a domain comprising the remote server, a code analysis to identify one or more traceability link between a code of the application and one or more document of the application and/or a static code analysis applied to the code.

According to some embodiments of the present invention there are provided computer program products for assuring correctness of data updated at a remote server and used by a local application, comprising:

A non-transitory computer readable storage medium.

First program instructions to receive from a remote server updated values for a plurality of data items associated with a dataset required for execution of an application executed by one or more processor. The dataset defines a close relation among the plurality of associated data items.

Second program instructions to determine whether the reception includes updated values for all of the associated data items.

Third program instructions to retrieve automatically from a local memory resource, previous values for all of the associated data items in case the updated value is missing for one or more of the associated data items.

Fourth program instructions to provide to the application the updated values or the previous values according to the determination.

Wherein the first, second, third and fourth program instructions are executed the one or more processors from the non-transitory computer readable storage medium.

The updated value is missing for the one or more associated data items due to a communication failure with the remote server. The determination includes checking reception of the updated value for each of the associated data items.

The local memory resource is a cache of the one or more processor, a memory coupled to the one or more processor and/or a non-volatile persistent memory coupled to the one or more processor.

The associated data items are associated with the dataset by a user identifying the close relation among the plurality of associated data items.

The associated data items are associated with the dataset by applying one or more of a plurality of automated tools to identify the close relation among the plurality of associated data items. The automated tool is a text analysis applied to one or more document relating to the remote server, an ontology applied to a domain comprising the remote server, a code analysis to identify one or more traceability link between a code of the application and one or more document of the application and/or a static code analysis applied to the code.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
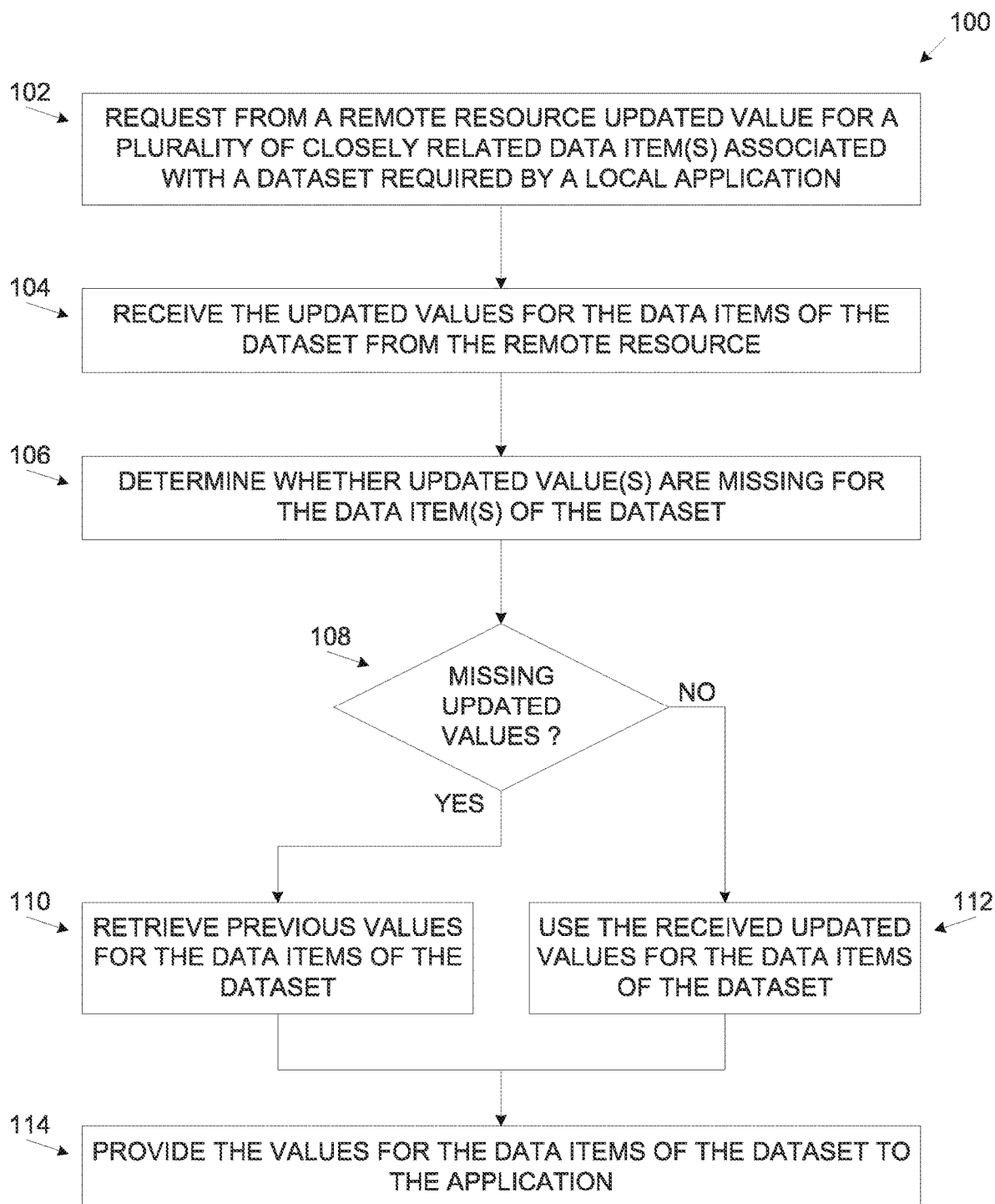
FIG. 1 is a flowchart of an exemplary process for assuring correctness of data missing due to a non-stable network connection, according to some embodiments of the present invention.

The present invention, in some embodiments thereof, relates to assuring correctness of data used by an application, and, more specifically, but not exclusively, to assuring correctness of data missing due to a non-stable network connection.

According to some embodiments of the present invention, there are provided systems and methods for assuring correctness of data received at a client terminal, for example, a Smartphone, a tablet, a laptop and/or the like from one or more remote servers, for example, a network processing node, a service, a backend service, a cloud service and/or the like. The received data may be required for execution of one or more local applications executed by the client terminal and may include a plurality of data items, for example, data, data fields, variables and/or the like that are defined as closely related with respect to the application as well as with respect to the remote server. The close relation indicates interdependence between the plurality of closely related data items maintain such that the closely related data items need to be of a same update time and/or update sequence such that the closely related data items maintain their interdependency. The plurality of closely related data items may typically be updated by the remote server. The plurality of closely related data items may further be exchanged between the client terminal and the remote sever multiple times during one or more communication sessions with each other. The plurality of closely related data items may be defined a dataset prior to execution of the (local) application to allow detection of the closely related data items and managing the data flow of the closely related data items to the application.

At the reception of updated values for the plurality of closely related data items at the client terminal, proper reception of the updated values for all the closely related data items associated with the dataset is checked to verify there are no missing updated values for any of the associated data items. The missing updated values may not be properly received at the client terminal due to poor and/or unstable network connection between the client terminal and the remote server resulting from, for example, the client terminal moving out of network coverage area and/or the client terminal going offline. In case the updated values are properly received for all the associated data items of the dataset, the updated values are provided to the application. In case the updated value(s) are missing for one or more of the associated data items, previous values of the associated data items may be retrieved from a local memory resource of the client terminal and provided to the application.

Assuring correctness of the closely related data items required by the application may present major benefits. Checking the proper reception of updated values for all the closely related data items associated with the dataset to identify missing updated values and determining whether there are missing updated values allows maintaining data correctness, integrity and/or synchronization of the associated data items of the dataset. The data correctness may therefore be maintained while the client terminal suffers an unstable network connection and/or operating in offline mode with no real time connection to the remote server. Maintaining the data correctness may be essential to verify proper execution of one or more processes, computations and/or calculations of the application by preventing the application from using mixed values for the closely related data items of the dataset. The mixed values may include updated values received during a latest communication session of the client terminal with the remote server and previous values received during previous communication sessions. Mixing the updated values for some of the closely related data items with previous values for other closely related data items main violate the interdependency of the closely related data items with each other and may result in improper execution of the (local) application.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of an exemplary process for assuring correctness of data missing due to a non-stable network connection, according to some embodiments of the present invention. A process 100 is executed to assure correctness of data received at a client terminal from one or more remote servers, for example, a network processing node, a service and/or the like. The data received at a client terminal is required for execution of one or more local applications executed by the client terminal. The received data may include a plurality of data items, for example, data, data fields, variables and/or the like that are defined as closely related with respect to the application as well as with respect to the remote server. The close relation indicates that the closely related data items maintain interdependence with each other and therefore need to be of a same update time and/or update sequence such that the such that the closely related data items maintain their interdependency. The application needs to use the closely related data items updated during the same update time and/or sequence at the remote server to avoid using some data items of one update time and other data items of a different update time. Avoiding mixture of the closely related data items updated during different times and/or sequences maintains the interdependency of the closely related data items and may be essential to verify proper execution of one or more processes, computations and/or calculations of the application. The close relation further indicates that the closely related data items are typically updated substantially together at the remote server. There may therefore be scenarios where the closely related data items are updated between communication sessions of the client terminal with the remote server. The plurality of closely related data items may further be exchanged between the client terminal and the remote sever multiple times during one or more communication sessions with each other. The closely related data items may be associated with a dataset that may be defined prior to execution of the application in order to allow tracking and/or managing of the associated data items. The process 100 is therefore used to verify that the associated data items used by the application are all synchronized with respect to the update time before providing the associated data items to the application. The process 100 determines proper reception of updated values for all the associated data items. In case the updated value(s) are missing for one or more of the associated data items, previous values of the associated data items may be retrieved from a local memory resource of the client terminal to maintain data correctness, integrity and/or synchronization of the dataset. Providing the previous values for the associated data items is done to avoid mixing the updated values with the previous values for the associated data items. The values, either the updated values in case of successful reception or the previous values in case of reception failure (i.e. missing updated values) are provided to the application based on the determination of the missing updated values.

Figure 2:
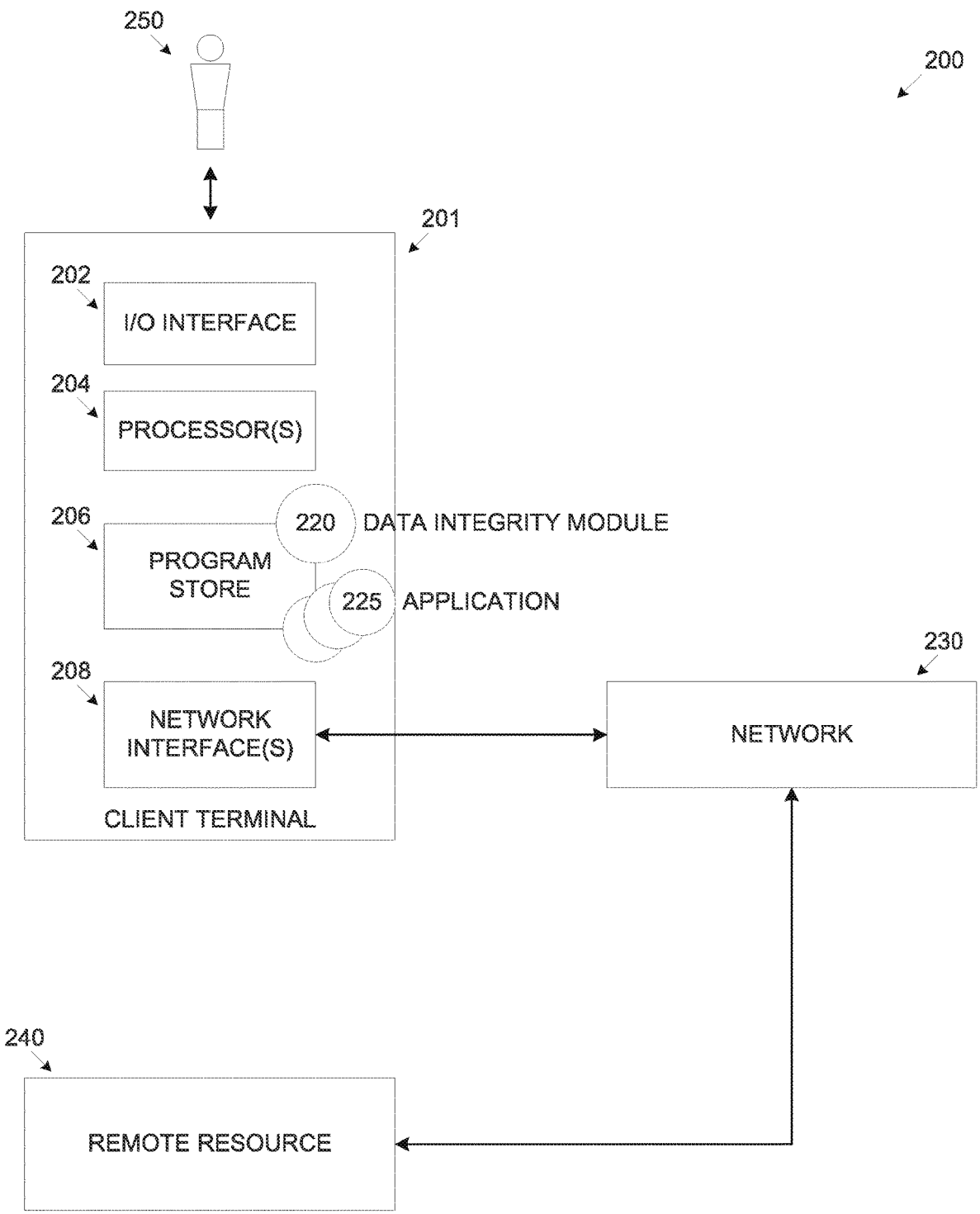
FIG. 2 is a schematic illustration of an exemplary system for assuring correctness of data missing due to a non-stable network connection, according to some embodiments of the present invention.

Reference is also made to FIG. 2, which is a schematic illustration of an exemplary system for assuring correctness of data missing due to a non-stable network connection, according to some embodiments of the present invention. A system 200 for executing a process such as the process 100 comprises a client terminal 201 that communicates with one or more remote servers 250 over one or more networks 230 to receive data items required for execution of one or more applications executed by the client terminal 201. The client terminal 201 used by a user 250 may be, for example, a Smartphones, a tablet, a laptop, a network connected wearable device and/or the like. The remote server 240 may include one or more network processing nodes, for example, a server, a remote networking node, a remote service, a backend service, a cloud service and/or the like. The network 230 may include one or more wired and/or wireless networks, for example, a local area network (LAN), a wide area network (WAN), the internet, a cellular network and/or the like.

The client terminal 201 includes an input/output (I/O) interface 202 for interacting with the user 250, a processor(s) 204, a program store 206 and a network interface 208. The user interface 208 may include a one or more human-machine interfaces to interact with the user 250, for example, a text interface, a pointing devices interface, a display, an audio interface and/or the like. The user interface 208 may include, for example, a graphic user interface (GUI) utilized through the human-machine interface(s). The processor(s) 204, homogenous or heterogeneous, may be arranged for parallel processing comprising one or more multi core processors. The program store 206 may include one or more non-transitory persistent memory storage devices, for example, a hard drive, a Flash array and/or the like. The network interface 208 may include one or more wired and/or wireless network interfaces for connecting to the network 230, for example, a LAN interface, a wireless LAN (WLAN) interface, a WAN interface, a cellular interface and/or the like. The campaign manager server 202 may be implemented through one or more networked processing nodes, for example, a server, a processing cluster comprising a plurality of processing nodes and/or the like. The processor(s) 204 may execute one or more applications 225 that are stored in the program store 206 and/or downloaded from one or more remote servers such as the remote server 240 over the network 230.

The process 100 may be executed by one or more software modules, for example, a data integrity module 220 comprising a plurality of program instructions executed by the processor(s) 204 from the program store 206. Wherein a software module may be, for example, a process, an application, a utility and/or the like that comprising a plurality of program instructions stored in a non-transitory medium such as the program store 206 and executed by a processor such as the processor(s) 204. The data integrity module 220 may further be a plugin and/or an add-on that is coupled to the application 225 to assure data correctness (integrity) of the data fetched by the application 250 from the remote server 240.

As shown at 102, the process 100 starts with the data integrity module 220 requesting (fetching) a plurality of closely related data items requested by the application 225 from the remote server 240 to execute one or more processes, computations and/or calculations. The data items may include, for example, data, data fields, variables and/or the like. The plurality of closely related data items may be associated with a dataset to allow the data integrity module 220 to easily identify the closely related data items and manage a data flow to and/or from the application 225. For brevity, the text of the present invention described herein after refers to one dataset and one application 225. However, the process 100 may be applied to detect and/or handle a plurality of datasets required by one or more application(s) 225 for one or more processes, computations and/or calculations of the application 225. Each of the datasets may comprise a plurality of data items and some of the data items may be associated with one or more of the datasets.

The close relation of the associated data items is defined according to two aspects. The first aspect that relates to the application 225 indicates that the application 225 requires the closely related data items together as a set. The closely related data items may maintain interdependence with each other and therefore have to be of a same update time and/or update sequence to prevent the application 225 from using some data items of one update time and other data items of a different update time. The second aspect indicated by the close relation relates to updating values of the closely related data items that is typically done by the remote server 240 and carried substantially concurrently such that the values of the closely related data items are updated together.

The dataset comprising the plurality of closely related data items may be predefined prior to the execution of the application 225. The plurality of closely related data items may be associated with the dataset through one or more of a plurality of methods, techniques and/or tools. The data items associated with the dataset may be identified by a designer, a programmer and/or an architect that developed the application 225 and/or the services provided by the remote server 240. The designer the programmer and/or the architect are familiar with the application 225 and/or the services provided by the remote server 240 and may therefore identify the interdependency of the closely related data items to define the dataset. The dataset may further be defined by the user 250 using the client terminal 201 executing the application 225.

Optionally, one or more automated tools may be applied to analyze the remote server 240 to identify automatically the dataset comprising the plurality of closely related data items. The analysis is directed at identifying the plurality of data items that are interdependent and may typically be concurrently updated. A text analysis may be executed to analyze documentation of the organization and/or provider of the services provided by the remote server 240. The text analysis may detect data items that are strongly connected to each other, i.e. concurrently updated by the remote server 240 to form the dataset. One or more ontologies may be used to analyze the remote server 240 and/or the domain of the remote server 240 to identify the plurality data items that are concurrently updated (closely related) and define the dataset.

Optionally, one or more automated tools may be applied to analyze the application 225 to identify automatically the dataset comprising the plurality of closely related data items. The analysis is directed at identifying the plurality of closely related data items that maintain interdependency with each other and therefore need to be synchronized with respect to their update time prior to being used by the application 225. Typically, the closely related data items are updated together at the remote server 240 at the same time and/or sequence. A traceability analysis may be used to identify links between one or more application documents of the application 225, for example, a requirements document and application code of the application 225 to extract the plurality of data items that are strongly connected to each other to define the dataset. For example, the user 250 may identify terms in the requirements document that should be used together, for instance a "username" and an "account number". One or more traceability analysis tools may then detect in the code of the application 225 variables that correspond to the identified terms to include the detected variable in the dataset of closely related data items. One or more code analysis methods, for example, a static code analysis and particularly a data flow analysis may be applied to identify the plurality of closely related data items to define the dataset. For example, the static code analysis may identify in the code of the application 225 variables that are typically updated at the same time and/or together to identify the dataset of closely related data items.

For example, the application 225 may involve three processes p1, p2 and p3 that require data items x, y and z for their execution. One or more methods, for example, the data flow analysis may be applied to the application 225 to identify and define the dataset. The data flow analysis may detect, for example, that the process p1 uses the data items x and z, the process p2 uses the data item y and the process p3 uses the data items x, y and z. Based on the data flow analysis the dataset is define to include the data items x and z.

As another example, the application 225 is a purchasing application that requires credit card information. The user 250 may identify two dataset each for one of two credit cards he owns, a dataset $SC_1$ and a dataset $SC_2$ each comprising two data items $F_1$ and $F_2$. The values of the two data items associated with the dataset $SC_1$ are $SC_1.F_1$=VISA and $SC_1.F_2$="1234". The values of the two data items associated with the dataset $SC_2$ are $SC_2.F_1$=MasterCard and $SC_2.F_2$="5678". In order to use the credit card information the two fields must be synchronized with each other.

As shown at 104, the data integrity module 220 receives updated values for the associated data items requested by the application 225 from the remote server 240.

As shown at 104, the data integrity module 220 checks whether the received data items are associated with a dataset that is required as a complete set by the application 225 to execute one or more processes, computations and/or calculations. The data items of the dataset are closely related and/or maintain a strong connection among themselves with respect to the execution of the application 225.

As shown at 106, the data integrity module 220 determines if the updated values are properly received for all the data items associated with the dataset requested by the application 225 from the remote server 240. The data integrity module 220 needs to verify the proper reception of the data items associated with the dataset to verify the updated value is not missing for one or more of the associated data items. The updated value(s) may be missing due to poor and/or unstable network connection of the network interface 208 to the network 230. The unstable network connection may result from the user 250 entering a limited coverage area, for example, a subway, a plane, a car and/or the like. The unstable network connection may also be encountered in a case where the application 225 has access to both public and restricted enterprise resources and the restricted resources become unavailable when user 250 leaves the enterprise premises. The unstable network connection may further result from an offline mode the client terminal 201 and/or the application 225 enters in order, for example, to preserve battery power.

The data integrity module 220 may use, for example, time tagging in which a time tag is assigned to each value of the dataset data items. The time tags may be assigned to the values of the data items at the remote server 240 and/or by the network interface 208. The time tagging may include assigning absolute time tags to the data items and/or a relative time tags (offset from base time). The data integrity module 220 may evaluate whether the values available for the data items are updated by comparing the time tags of each of the values with a clock source available to the data integrity module 220. As another example, the values of the data items of the dataset may be assigned with identification (ID) such that a group of values that are updated together as assigned the same ID.

As shown at 108 that is a decision point, in case the data integrity module 220 determines if the updated values are missing for any of the data items associated with the datasets. In case the data integrity module 220 determines that no updated values are missing, the process 100 branches to 112. In case one or more updated values are missing for one or more respective data items of the dataset, the process 100 branches to 110. It is sufficient that the updated value is missing for only one associated data item to drop the other updated values that may have been properly received and branch to 110.

As shown at 110, in case the updated value is missing for one or more of the data items associated with the dataset, the data integrity module 220 may retrieve previous values for the associated data items. The previous values may be values received at the client terminal 201 during a previous communication session between the client terminal 201 and the remote server 240. The previous values may be stored locally at the client terminal in one or more memory locations, for example, a cache of the processor(s) 204, a memory coupled to the processor(s) 204, the program store 206 and/or the like.

As shown at 112, in case the updated value is properly received for all of the data items associated with the dataset, the data integrity module 220 collects the updated values.

As shown at 114, the data integrity module 220 forwards the values for the associated data items. In case the data integrity module 220 determines that the updated value is properly received for all of the associated data items, the data integrity module 220 provides the updated values to the application 225. In case the integrity module 220 determines that the updated value is missing for one or more of the associated data items, the data integrity module 220 provides the previous values to the application 225. That way the data integrity module 220 verifies that the associated data items values provided to the application 225 are all updated at the same time, either during the recent reception from the remote server 240 or during a previous reception.

Optionally, the data integrity module 220 prevents the application 225 from using the associated data items until the updated values are properly received for all of the associated data items during one or more following communication sessions with the remote server 240.

Assuring the data correctness by data integrity module 220 may be essential and even crucial to prevent incorrect results and/or failure of respective processes, calculations and/or computations of the application 225.

An example is presented to demonstrate the potential risk of providing the dataset to the application 225 without applying the data assurance process 100 followed with the same example using the data integrity module 220 to mitigate the potential risk by assuring data correctness of the dataset prior to providing the dataset to the application 225.

Assuming A and B are two objects used by the application 225 with A.x and B.y being fields of the objects A and B respectively. The fields A.x and B.y are closely related such that they are involved together in a specific calculation of the application 225 and are therefore associated with the same dataset. The following sequence describes a scenario involving update of the fields A.x and B.y.

- At a time $T_0$, the fields A.x and B.y are stored in the local memory location at the client terminal 201. The fields A.x and B.y are assigned with values A.x=x1 and B.y=y1 that are available from a previous communication session (previous reception) with the remote server 240, and these values are stored in local cache;
- At time $T_1$ (later than $T_0$) the values of the fields A.x and B.y are changed at the remote server 240 as follows: A.x=x2, B.y=y2.
- At time $T_2$ (later than $T_1$) the client terminal 201 attempts to fetch the field A.x from the remote server 240. The field A.x is properly received at the client terminal 201, i.e. A.x=x2 at the client terminal 201.
- At time $T_3$ (later than $T_2$) the client terminal 201 attempts to fetch the field B.y from the remote server 240. However due to a failure and/or instability of the network 230, reception of the field B.y fails and the field B.y is retrieved from the local memory location, i.e. B.y=y1 at the client terminal 201.
- At time $T_4$ (later than $T_3$) A.x and B.y are invoked by the calculation of the calculation of the application 225 with the values A.x=x2 and B.y=y1. The values of the two fields A.x and B.y are of different update time and the result of the calculation may therefore be incorrect.

However when applying the process 100, at time $T_4$ when A.x and B.y are invoked, the data integrity module 220 checks if the updated values are properly received for both the associated data items—A.x and B.y. The data integrity module 220 determines that the updated value for the field B.y is missing (not properly received) and therefore the data integrity module 220 provides the previous values A.x=x1 and B.y=y1 to the application 225 such that the values of the same update time are used by the application 225.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the term commerce information and price is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computer implemented method or improving data integrity and correctness of data updated at a remote server and transmitted over a network to be used by an application locally installed on a client terminal, comprising:
   using at least one processor at said client terminal for:
   receiving from said remote server through said network, plurality of updated values;
   checking said reception to determine whether said reception includes updated values for all of a plurality of data items associated with a dataset required for execution of said application by said at least one processor, said dataset defines a close relation among said plurality of associated data items;
   identifying, by said checking, one or more missing values for one or more data items from said plurality of associated data items;
   according to said determination providing said application with a previous value for each of the one or more data items;
   wherein the previous value is received during a previous communication session between the client terminal and the remote server and is automatically retrieved from a local memory resource;
   wherein said plurality of associated data items are associated with said dataset by at least one of the following:
   a) applying a text analysis on at least one document relating to said remote server to identify said close relation among said plurality of associated data items,
   b) using at least one ontology to extract said dataset from a domain comprising said remote server,
   c) analyzing at least one document of said application with respect to a code of said application to identify at a least one traceability link among said plurality of associated data items, and
   d) applying a static code analysis to identify said close relation among said plurality of associated data items.

2. The computer implemented method of claim 1, wherein said close relation of said dataset indicates that said plurality of associated data items are interdependent and are required together as a set by said application.

3. The computer implemented method of claim 1, wherein said close relation of said dataset indicates that said plurality of associated data items are updated by said remote server between communication session with said remote server.

4. The computer implemented method of claim 1, wherein said one or more missing values are missing due to a communication failure with said remote server.

5. The computer implemented method of claim 1, wherein said local memory resource is a member of a group consisting of: a cache of said at least one processor, a memory coupled to said at least one processor and a non-volatile persistent memory coupled to said at least one processor.

6. The computer implemented method of claim 1, wherein said plurality of associated data items are associated with said dataset by a user identifying said close relation among said plurality of associated data items.

7. A system for improving data integrity and correctness of data updated at a remote server and transmitted over a network to be used by an application locally installed on a client terminal, comprising:
   a network interface for communicating with said remote server;
   a program store storing a code; and
   at least one processor coupled to a said network interface and said program store for executing the stored code, the code comprising:
   code instructions to receive from said remote server through said network a plurality of updated values;
   code instructions to check said reception for determining whether said reception includes updated values for all of a plurality of data items associated with a dataset required for execution of said application by said at least one processor, said dataset defines a close relation among said plurality of associated data items;
   code instructions to identify, by said checking, one or more missing values for one or more data items from said plurality of associated data items;
   code instruction to provide said application with a previous value for each of the one or more missing values according to said determination;
   wherein the previous value is received during a previous communication session between the client terminal and the remote server and is automatically retrieved from a local memory resource;
   wherein said plurality of associated data items are associated with said dataset by applying at least one of a plurality of automated tools to identify said close relation among said plurality of associated data items, wherein said at least one of a plurality of automated tools is a member selected from a group consisting of: a text analysis applied to at least one document relating to said remote server, an ontology applied to a domain comprising said remote server, a code analysis to identify at least one traceability link between a code of said application and at least one document of said application and a static code analysis applied to said code.

8. The system of claim 7, wherein said one or more missing values are missing due to a communication failure with said remote server.

9. The system of claim 7, wherein said local memory resource is a member of a group consisting of: a cache of said at least one processor, a memory coupled to said at least one processor and a non-volatile persistent memory coupled to said at least one processor.

10. The system of claim 7, wherein said plurality of associated data items are associated with said dataset by a user identifying said close relation among said plurality of associated data items.

11. A computer program product for improving data integrity and correctness of data updated at a remote server and transmitted over a network to be used by an application locally installed on a client terminal, comprising:

a non-transitory computer readable storage medium;

first program instructions to receive from said remote server, through said network, a plurality of updated values;

second program instructions to check said reception for determining accordingly whether said reception includes updated values for all of a plurality of associated data items associated with a dataset required for execution of said application by at least one processor, said dataset defines a close relation among said plurality of associated data items;

third program instructions to identify, by said checking, one or more missing value for one or more data items from said plurality of associated data items;

fourth program instructions to provide to said application with a previous value for each of the one or more data items according to said determination;

wherein the previous value is received during a previous communication session between the client terminal and the remote server and is automatically retrieved from a local memory source;

wherein said first, second, third, and fourth program instructions are executed by said at least one processor from said non-transitory computer readable storage medium, wherein said plurality of associated data items are associated with said dataset by applying at least one of a plurality of automated tools to identify said close relation among said plurality of associated data items, wherein said at least one of a plurality of automated tools is a member selected from a group consisting of: a text analysis applied to at least one document relating to said remote server, an ontology applied to a domain comprising said remote server, a code analysis to identify at least one traceability link between a code of said application and at least one document of said application and a static code analysis applied to said code.

12. The computer program product of claim 11, wherein said one or more missing values are missing due to a communication failure with said remote server.

13. The computer program product of claim 11, wherein said local memory resource is a member of a group consisting of: a cache of said at least one processor, a memory coupled to said at least one processor and a non-volatile persistent memory coupled to said at least one processor.

14. The computer program product of claim 11, wherein said plurality of associated data items are associated with said dataset by a user identifying said close relation among said plurality of associated data items.

* * * * *